United States Patent [19]
Brown

[11] 3,781,466
[45] Dec. 25, 1973

[54] INFORMATION STORAGE APPARATUS

[75] Inventor: Kenneth Robson Brown, Midlothian, Scotland

[73] Assignee: Ferranti Limited, Hollinwood, Lancashire, England

[22] Filed: Apr. 11, 1972

[21] Appl. No.: 242,929

[30] Foreign Application Priority Data

April 13, 1971 Great Britain.................. 9214/71

[52] U.S. Cl............ 178/6.8, 178/7.89, 178/DIG. 22, 178/DIG. 28

[51] Int. Cl........................... H01j 29/89, H04n 1/24

[58] Field of Search............... 178/7.7, 6.8, DIG. 22, 178/7.82, 7.88, 7.89, DIG. 28

[56] References Cited

UNITED STATES PATENTS

| | | | |
|---|---|---|---|
| 3,004,242 | 10/1961 | Honeiser | 178/DIG. 22 |
| 3,131,247 | 4/1964 | Benamy | 178/DIG. 22 |

*Primary Examiner*—Howard W. Britton
*Attorney*—Gordon W. Daisley

[57] ABSTRACT

Information storage apparatus for use as a back-up store for a moving-map display has the information encoded onto part of the film carrying the map charts. To read the information the optical system is modified so that the information is scanned by a flying-spot scanner.

7 Claims, 5 Drawing Figures

INFORMATION STORAGE APPARATUS

This invention relates to information storage apparatus, and in particular to such apparatus for use as a back-up store for the computer controlling a moving-map display.

Many types of vehicle, particularly aircraft, use computer-controlled moving-map displays to indicate the position of the vehicle at any instant. Frequently the computer which controls the display is also used for other purposes. The computer requires a digital data store to enable it to carry out its functions, and frequently the data is stored in a manner which may be accidentally changed, say by a temporary power surge or failure. In such a case it is advisable, if not essential, to have a read-only back-up store which may be used to restore the computer store to its original state.

Such a back-up store may take many forms, but these almost inevitably involve a separate piece of equipment. In an aircraft space is often at a premium, and siting such a back-up store may be difficult. Equally, such a store will necessarily add to the expense of the computer associated with a moving-map display.

According to the present invention there is provided information-storage apparatus which includes a strip of film suitable for carrying at least one chart and encoded digital information, a viewing screen, a light source and an optical system arranged to project an image of at least part of the chart on to a screen, means for moving the film as required in two coordinate directions so as to display any required part thereof, a cathode-ray tube and a light-sensitive device together operable to function as a flying-spot scanner, and means for modifying the said optical system in such a manner that light from the cathode-ray tube may be focussed on the film and thence on to the light sensitive device to read out the encoded digital information.

The invention will now be described with reference to the accompanying drawings, in which.

Figure 1:
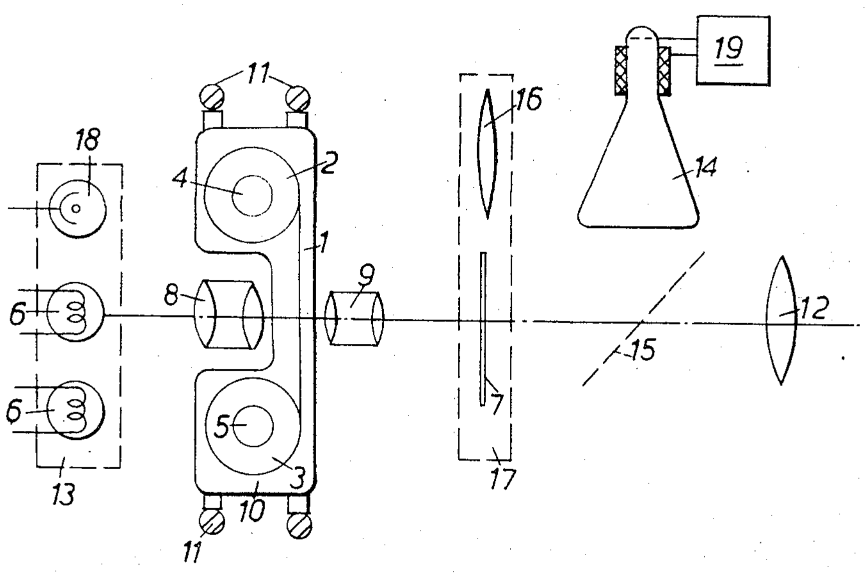
FIGS. 1 and 2 are schematic diagrams of the main parts of a moving-map display incorporating an optical back-up store according to a first embodiment of the invention.

Referring now to FIG. 1, the basic-moving-map display equipment is centred around a length of film 1 carrying one or more topographical transparencies or charts. This film is stored on two reels 2 and 3 each of which has an associated drive motor 4 and 5 respectively. A lamp 6 is used to project an image of part of the film 1 on to a translucent screen 7 through an optical system comprising a condenser lens 8 and a projection lens 9. The film 1 may be moved from one reel to the other to obtain movement in one co-ordinate direction, and the film reels are themselves mounted on a carriage shown schematically at 10 which may be moved in a direction transverse to the length of the film along rails 11. Thus any desired part of the film may be displayed, measuring means being provided to determine the precise position of the film at any instant. The screen 7 is viewed by an observer through a lens 12.

It is usual to provide in a moving-map display automatic lamp-changing means comprising a slide 13 or turret carrying several lamps 6.

In use the display is controlled by a computer so that the terrain being displayed is that actually being transversed by the vehicle, though arrangements are provided so that the map may be moved — to enable the "driver" to "look-ahead," for example. The map is usually in the form of a number of separate sections, and rapid transport means are provided to move the film rapidly from one section to another as the vehicle moves out of the area covered by one section.

The back-up store for the computer controlling the display comprises a length of film carrying the necessary digital information in optically encoded form. Conveniently this information will be located together on one length of film, which may, for example, be at one end or in the centre of the length carrying the transparencies. In order to read out this information the optical system has to be modified to enable the information to be scanned. A cathode-ray tube 14 is provided to act as a flying-spot light source. This is located away from the projection axis, and hence a mirror 15 has to be moved into position when information read-out is required. The screen 7 has to be replaced by a lens 16 to compensate for the change in length of the optical path. Conveniently the lens 16 and screen 5 may be mounted on a moveable slide 17. The mirror 15 may be similarly mounted. The lamp slide 13 carries in one position a photo-sensitive device 18 such as a photo-electric cell.

Figure 2:
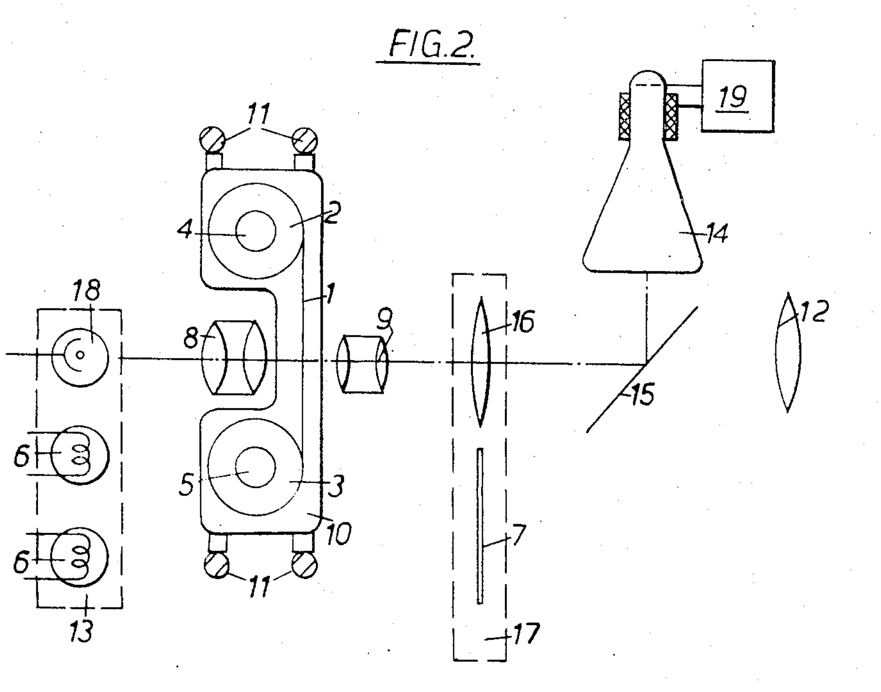

When the back-up store is required, several things occur simultaneously in preparation for the read-out of the optically-encoded information as shown in FIG. 2. The slides 13 and 17 move to position the photo-cell 18 and the lens 16, the mirror 15 is moved into position, and the cathode-ray tube 14 is energised, under the control of a scan generator 19. The observer's view is blocked by the mirror 15. Simultaneously the film 1 is moved rapidly to the section carrying the information.

When these events have occurred the information read-out may commence. The scan generator 19 causes the light spot on the face of the cathode-ray tube 14 to scan repetitively across the film 1 in a straight line whilst the film is moved steadily from one reel to the other. The output of the photo-cell 18 is processed by circuitry (not shown) and used to provide the required decoded information.

Figure 3:
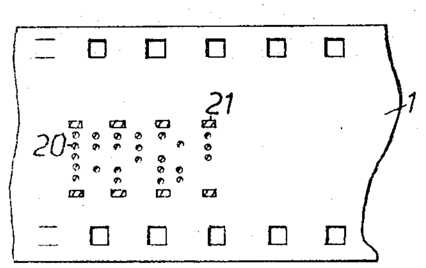
FIG. 3 illustrates one manner in which the digital information may be stored.

FIG. 3 illustrates one method of encoding the information on the film 1. The digits of a word are represented by opaque spots 20 on the film arranged across the film, this also being the scanning direction. Successive words are arranged in order along the length of the film. It is possible to synchronise the repetition rate of the scan with the film transport speed, but it is simpler to provide means for detecting the beginning and end of each word. Conveniently this may comprise larger opaque spots 21 at the beginning and end of alternate words as shown. Other means of encoding the information are possible, and coloured spots, rather than black ones, may be used to reduce errors and simplify error-correction techniques.

Figure 4:
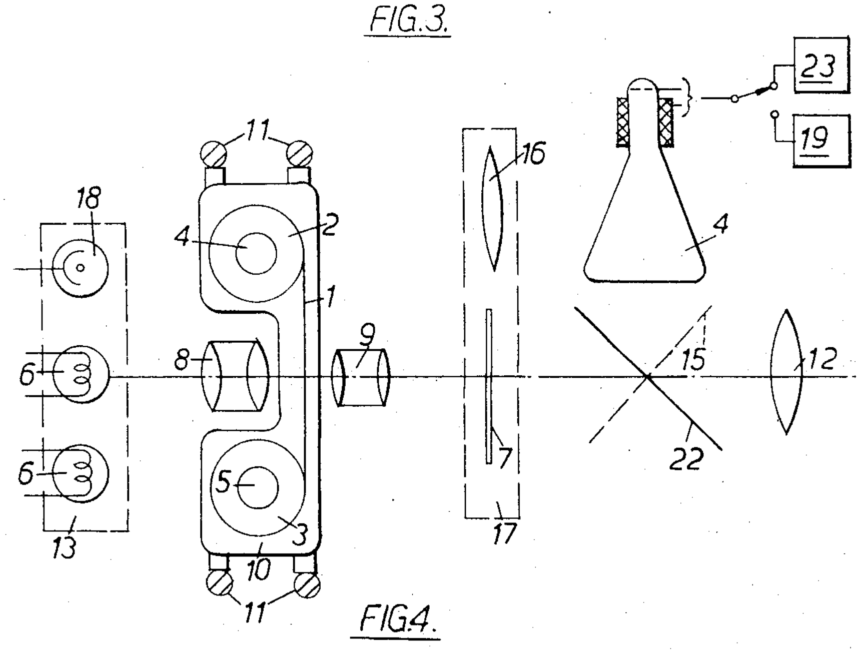
FIGS. 4 and 5 are schematic diagrams of second and third embodiments of the invention.

In the embodiment described above with reference to FIGS. 1 and 2 the cathode-ray tube 14 is provided purely as a flying-spot scanner light source. However, many moving-map displays incorporate a cathode-ray tube used to superimpose a radar or other display on the projected topographical transparency. One such case is shown in FIG. 4 and uses a semi-transparent mirror 22 located in the position shown in FIGS. 1 and 2 for mirror 15 but angled in the opposite direction so that light from the translucent screen 7 may pass through the mirror which also reflects light from the cathode-ray tube towards the observer. This semi-transparent mirror will be located on the slide carrying the mirror 15. Such an arrangement also requires means for disconnecting the source of display information 23 from the cathode-ray tube and replacing it with the scan generator 19.

Figure 5:
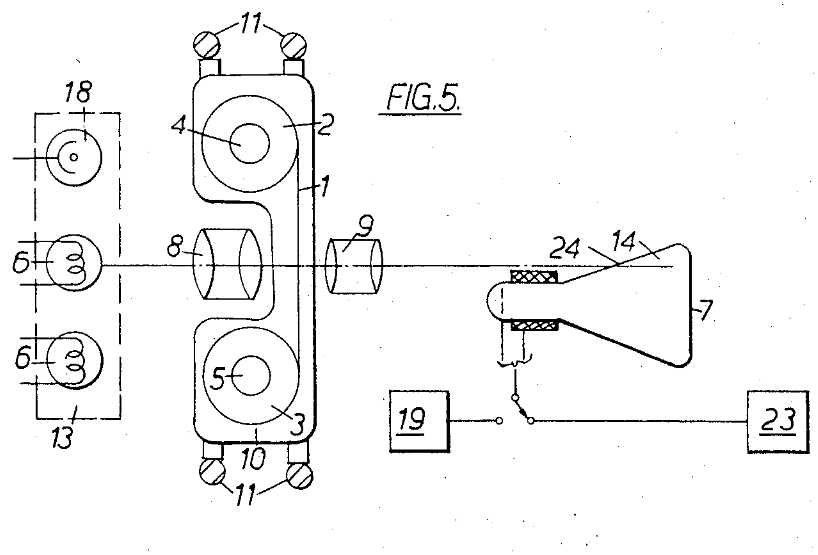

FIG. 5 illustrates the arrangement to be used if the display information is displayed on a cathode-ray tube having a rear optical window through which the film is projected on to the screen of the cathode-ray tube. The same reference numerals are used as in FIG. 1, where applicable. In this case the screen 7 is the screen of the cathode-ray tube 12, which has a rear window 24. The optical system for projecting the film 1 is the same as in FIGS. 1 and 2, except that the lens 12 is omitted. The cathode-ray tube 14 is normally fed from a radar receiver 23.

When the optically encoded information is required the lamp slide 13 is moved to position the photo-cell 18 on the optical axis, and the display source 23 is replaced by the scan generator 19. These are the only modifications necessary. The information is read out as before.

It may be necessary to include means for ensuring correct registration between the information on the film and the optical axis during read-out since the film may move transverse to its length. This may be done by providing suitable markings on the film and logic circuitry for controlling the film position. This may also be used to ensure that the scan and the coded information are not skew.

If the cathode-ray tube 14 is used as a radar display tube, as may be the case in the embodiments of FIGS. 4 and 5, it will probably have a long-persistence phosphor, due to the relatively low scan-rate. However, a flying-spot scanner tube must have a very short persistence to achieve a high spot speed. This apparent conflict may be resolved by the use of a cathode-ray tube having two phosphors of different persistence, and by suitably controlling the electron beam velocity. If rotating scan coils are used for the radar display then these would have to be aligned to give a horizontal scanning trace. If, however, the display produced by the cathode-ray tube is, for example, a television-type display the problem will not arise, and the same scan generator may be used for both display and flying-spot scanner operation. It will be seen from the above description that the back-up store is relatively inexpensive and simple, since almost all the components are already present in the moving-map display.

What I claim is:

1. Information-storage apparatus which includes a strip of film carrying at least one chart and encoded digital information, a viewing screen, a light source and an optical system arranged to project an image of at least part of the chart onto the screen, means for moving the film in two co-ordinate directions so as to display any required part thereof on the screen, a cathode-ray tube and a light-sensitive device together operable as a flying-spot scanner, and means for so modifying the said optical system that light from the cathode-ray is focussed on the film and thence onto the light-sensitive device to read out the encoded digital information.

2. Information-storage apparatus as claimed in claim 1 in which the cathode-ray tube is operable to produce a spot of light which scans across the film in a direction transverse to its length.

3. Information-storage apparatus as claimed in claim 1 in which the cathode-ray tube is used to provide a display which may be combined with that from said film.

4. Information-storage apparatus as claimed in claims 3 in which the display produced by the cathode-ray tube is a radar-type display.

5. Information-storage apparatus as claimed in claim 1 in which the means for modifying the said optical system is operable to replace the light source by the light sensitive device.

6. Information-storage apparatus as claimed in claim 5 in which the means for modifying the optical system is also operable to replace the viewing screen by means for directing the light from the cathode-ray tube onto the film.

7. Information-storage apparatus as claimed in claim 5 in which the cathode-ray tube has an envelope with a window therein and a screen, and provides a display which is combined with that of said film by projecting the said image through said window onto the screen of the cathode-ray tube.

* * * * *